United States Patent
Steck, III

[11] Patent Number: 6,032,403
[45] Date of Patent: Mar. 7, 2000

[54] FISHHOOK QUICK RELEASER

[76] Inventor: William F. Steck, III, 98 Gunclub Rd., Stamford, Conn. 06903

[21] Appl. No.: 09/288,152

[22] Filed: Apr. 8, 1999

Related U.S. Application Data

[60] Provisional application No. 60/081,450, Apr. 13, 1998.

[51] Int. Cl.[7] .................................................. A01K 97/18
[52] U.S. Cl. .............................................................. 43/53.5
[58] Field of Search ................................................ 43/53.5

[56] References Cited

U.S. PATENT DOCUMENTS

| | | |
|---|---|---|
| 1,611,544 | 12/1926 | maurus . |
| 2,164,907 | 7/1939 | Falkner . |
| 2,586,431 | 2/1952 | Krichbaum . |
| 2,644,268 | 7/1953 | Klinicki . |
| 3,670,448 | 6/1972 | Wehmeyer ............................. 43/53.5 |
| 3,680,248 | 8/1972 | Wilkinson ............................. 43/53.5 |
| 4,014,130 | 3/1977 | Roberts ................................. 43/53.5 |
| 5,644,865 | 7/1997 | Harrison et al. ...................... 43/53.5 |

FOREIGN PATENT DOCUMENTS

| | | | |
|---|---|---|---|
| 828416 | 12/1969 | Canada ................................. 43/53.5 |
| 1129317 | 12/1955 | France ................................. 43/53.5 |

*Primary Examiner*—Jack W. Lavinder

[57] ABSTRACT

A hand held device for disengaging a fish hook from a fish's mouth without the need to remove the fish from the water. The device comprises a through bored tubular body having a proximal end sized for manual gripping and a distal end sized for insertion into a fish's mouth, and also has a slot extending the length of the tubular body. The device is operated by aligning the slot with fishing line, which is taut from the pull of a fish line, and pushing it into the through bore. The fisherman then slides the device down the fishing line and engages the bend of the fish hook with the front edge of the device, and pushes abruptly. This releases the fish. Flanges, which are operable to inhibit accidental exit of a fishing line during the release process, extend from the both sides of the slot inwardly into through bore.

4 Claims, 3 Drawing Sheets

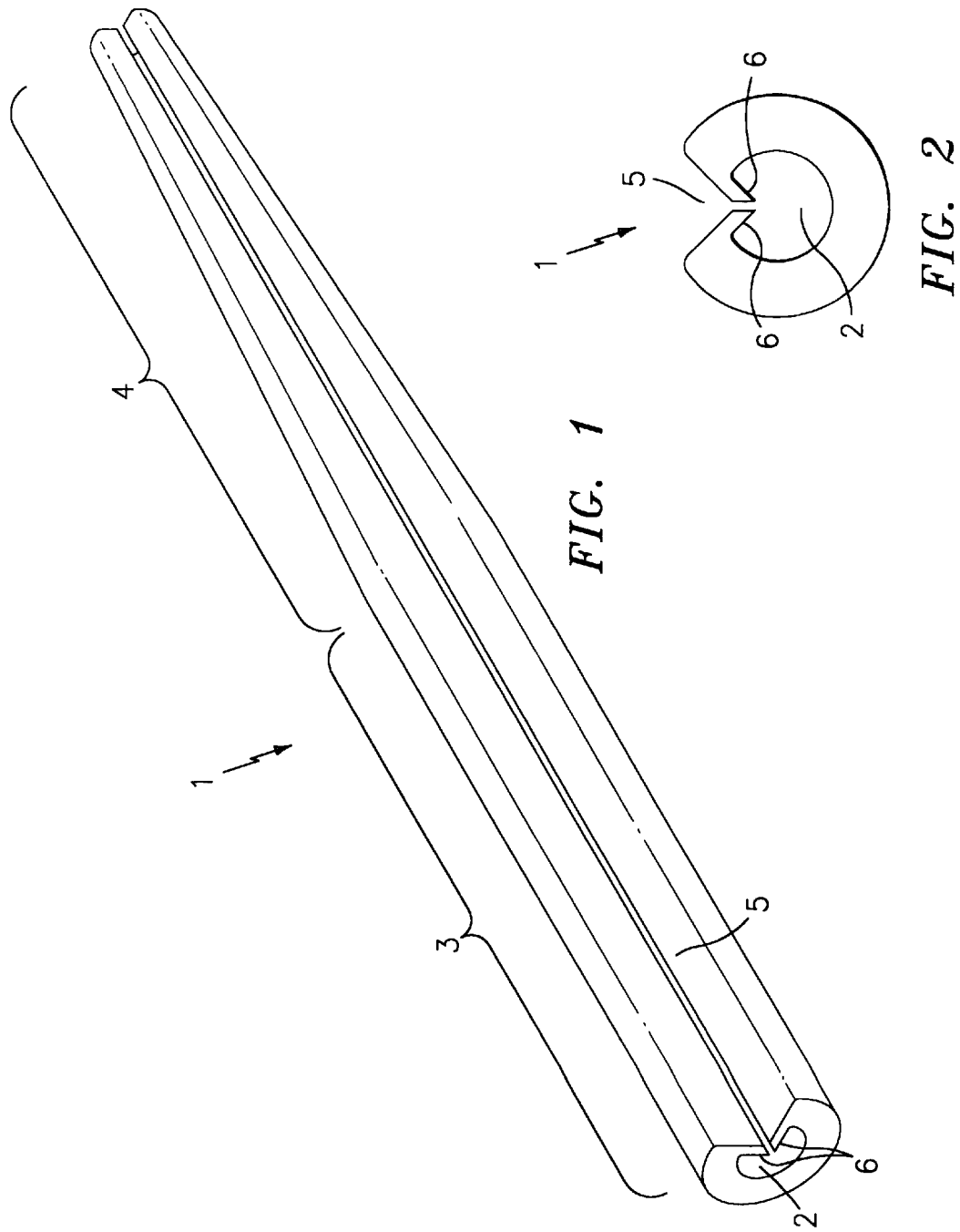

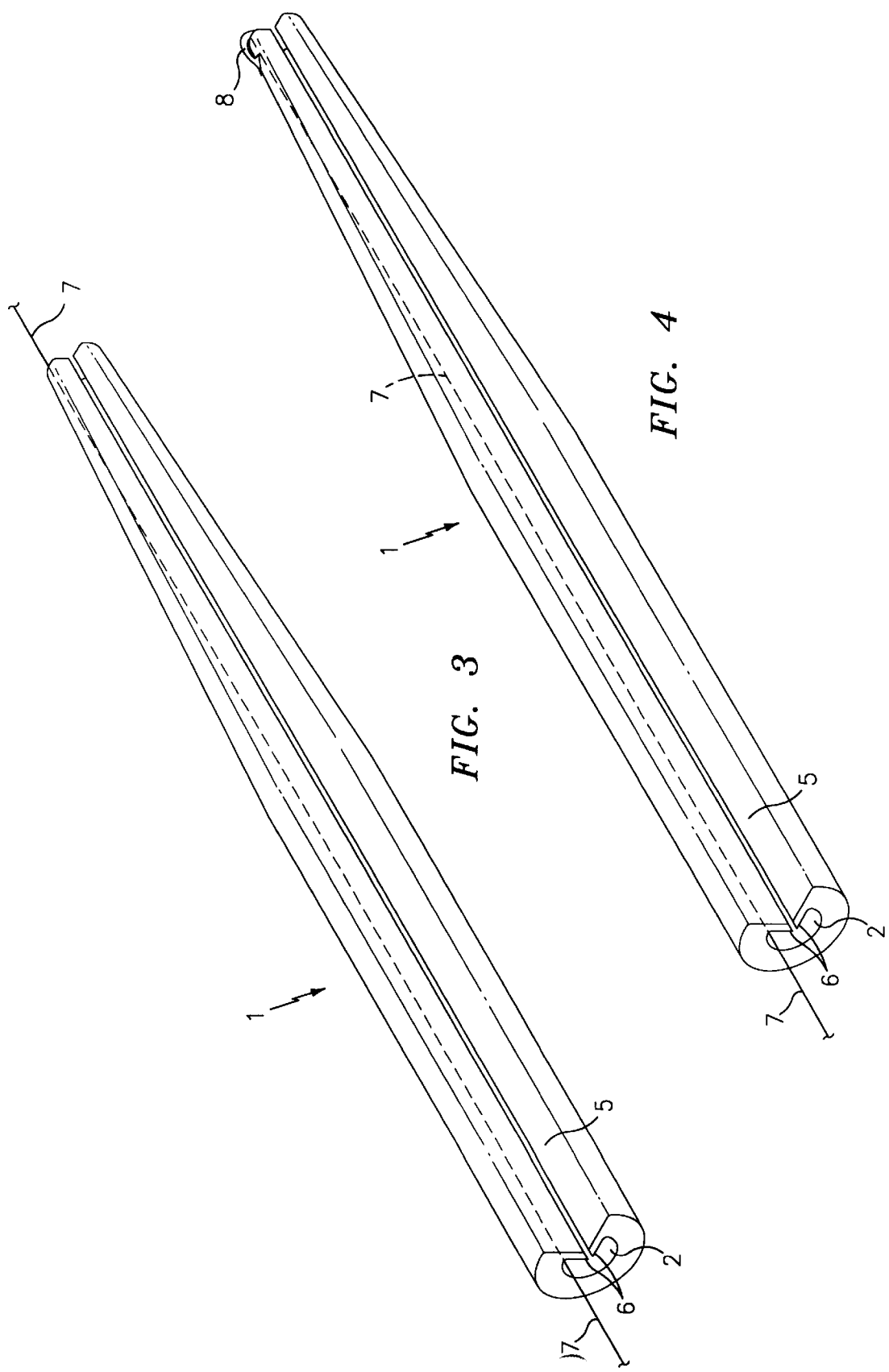

FISHHOOK QUICK RELEASER

This application claims Domestic priority to the provisional application 60/081450 filed on Apr. 13, 1998 now expired.

TECHNICAL FIELD

Many fishermen release the fish they catch either because regulations require it or because they simply prefer to. When a fish is caught with an artificial fly, releasing it without injury is easier than releasing one caught with bait. This is because a fish usually swallows a baited hook and is thereby fatally hooked, while a fish that takes an artificial fly immediately recognizes the fly is not something to eat and spits it out. Thus fly-caught fish tend to be hooked in the outer part of the mouth where the hook is accessible. But nonetheless, it is usually necessary to handle a fish caught on a fly to affect release. Such handling, however minimal, can harm or even kill it. The object of this invention is to provide a means whereby a fisherman can release fly-caught fish without handling them, and thus without injury.

BACKGROUND ART

Currently, there is a device on the market, called "Ketchum Release"—Patent Number 5,644,865—which simplifies and improves the process of releasing fish caught with flies. In fact, as with the object of this invention, "Ketchum Release" effects release without having to net first, and without injury. "Ketchum Release" is a hand-held device made in a variety of sizes to accommodate various sizes of flies. All sizes are configured essentially alike. "Ketchum Release" comprises a handle portion and a business end which resembles a longitudinally oriented tube with a slit running its length. (The slitted tube portion of the most popular size is approximately ¾ inches long, and approximately 2 inches long on the larger versions.) When a fish is caught, the fisherman reaches out with the "Ketchum Release" in his free hand and captures the taut line in the slitted tubular section of the device by sliding the line into the slit. This maneuver is facilitated by the design of the connecting piece that joins the handle to the tubular section. Next the fisherman slides the device down the line and over the eye and shank of the hook and engages the bend of the hook with the edge of the tubular section. Finally he pushes the device abruptly toward the bend of the hook. This releases the hook.

While it is an adequate device, the "Ketchum Release" has following four drawbacks: First: A fishing line is usually in continuous motion when a fish is on the end. Hence, since the tubular portion of the "Ketchum Release" is circular, the line is apt to be sliding over the tube's slit again and again, and would eventually slip into the slit and escape containment if a procedure were not followed to avoid it. This procedure calls for pushing the device against the taut line in such a way as to keep the line away from the slit. Since this has to be done at the same time that the fisherman is trying to properly engage the hook, it makes the job of engagement more difficult. Second: It is not sound ergonomics for the business end of a tool to be at an angle to the handle of a tool, as with the "Ketchum Release". Knives, forks, spoons, screwdrivers, paint brushes, and other commonly used devices, are designed so that the business end is in a straight line with the handle. But "Ketchum Release" is not a straight-line device, and it is awkward to use. Third: The tubular section of "Ketchum Release" sometimes cannot be inserted into the fish's mouth at the proper angle because the handle hits the fish's nose or jaw. This occurs because the tubular section is at an angle to the handle. If the fisherman rotates "Ketchum Release" to avoid the fish's nose, the line is apt to slip into the tube's slit and out of containment. Fourth: Because the fisherman is much occupied with keeping the line away from the tube's slit, maneuvering to engage the bend of the hook is made more difficult.

There are other devices on the market for releasing fish hooks. Most are tools with "V" shaped ends that the fisherman maneuvers to engage the bend of the hook. However, it is all but impossible to succeed with these devices without netting and handling because the movement of a fighting fish makes it all but impossible get the "V" groove lined up.

BRIEF SUMMARY OF THE INVENTION

This invention is for a device which overcomes the drawbacks of other devices without introducing any new ones of its own. How it does this will become clear as its description unfolds. This invention is a simple, one piece device that is easy to manufacture in that it is made by beginning with an extrusion, is cut off to the appropriate length, and then tapered. The device is easy to use because, like knives, files, screwdrivers, and so on, it is designed to the natural way humans manuever their hands.

BRIEF DESCRIPTION OF THE DRAWINGS

FIG. 1 is a top view of the device of this invention.

FIG. 2 is a cross sectional view of the device of this invention.

FIG. 3 shows a fly line inside the through bore of the device of this invention.

FIG. 4 shows a hook engaged by the front edge of the distal section of the device of this invention.

DETAILED DESCRIPTION OF THE INVENTION

Figure 5:
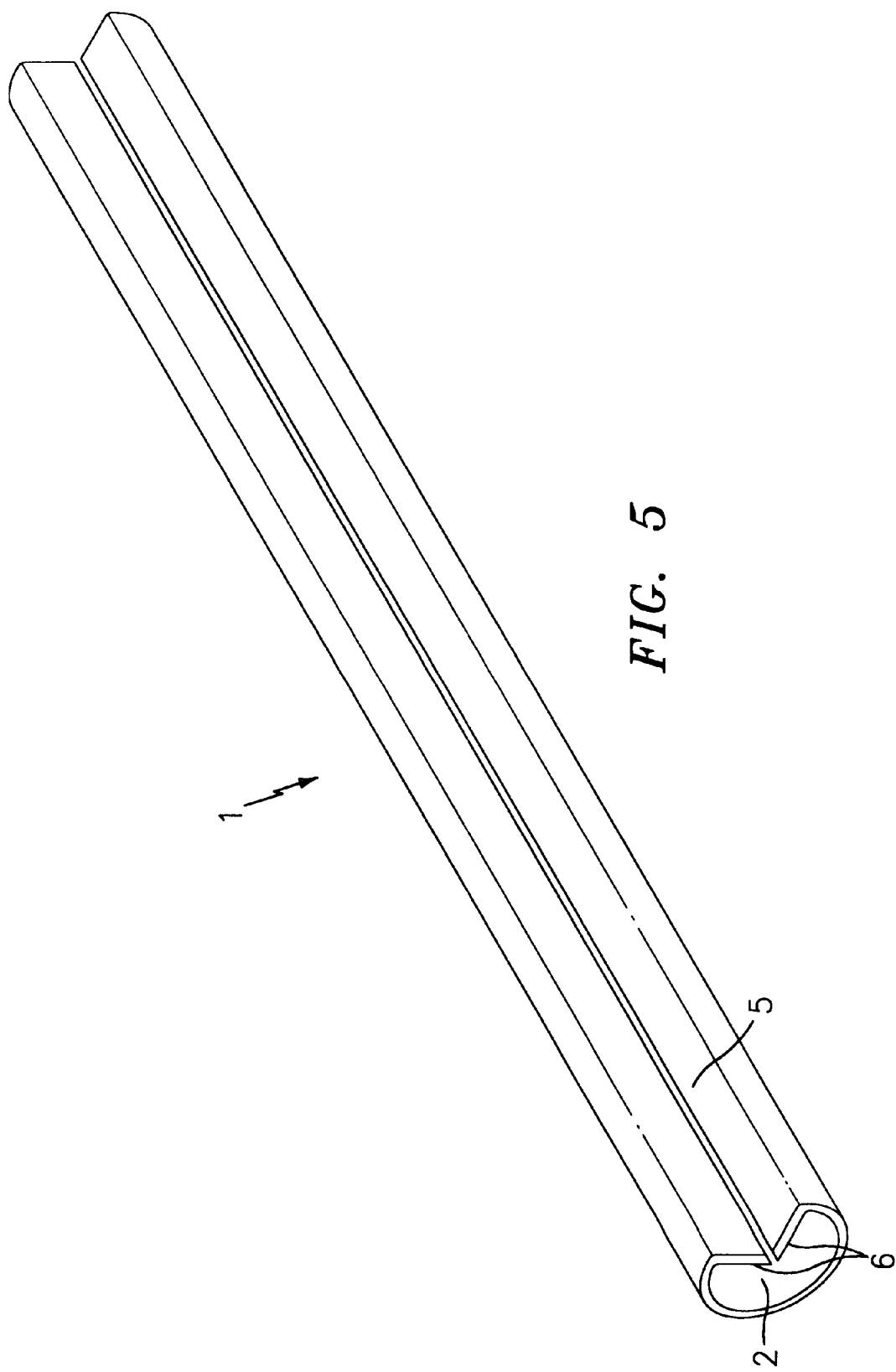
FIG. 5 is an embodiment of this invention that is more suitable for larger fish.

Referring now to FIG. 1 and FIG. 2, the first embodiment of this invention is shown as device 1. Device 1 is a tubular body with a through bore 2. It is tapered down from a larger diametered proximal end 3, which is sized for manual gripping, to a smaller diametered distal end 4, which is sized to fit into a small fish's mouth. The wall thickness at the tip of distal end 4, defined as the space between the outer perimeter of device 1 and the outer perimeter of its through bore 2, is sized to fit between the barb and shank of even the smallest fish hook. Slot 5, which extends the length of device 1, and is sized and shaped to facilitate radial passage of a fly line into through bore 2, extends inwardly into through bore 2 so as to form flanges 6 on each side of slot 5. As will be seen, flanges 6 are operable to inhibit the accidental escape of a fly line captured inside through bore 2.

Referring to FIG. 3 and FIG. 4, the function of the device is described: When a fish is hooked and a fly line 7 is thereby drawn taut, the fisherman grasps device 1 in the hand not holding the fishing rod, and captures fly line 7 into device 1 by aligning slot 5 with fly line 6 and pushing it into through bore 2. Once fly line 7 is inside through bore 2, flanges 6 inhibit it from accidentally slipping out. Next, free from concern that line 6 might escape containment, the fisherman slides device I down fly line 7, engages the bend of hook 8 with the front edge of distal end 4, and abruptly pushes device 1 at hook 8. This releases hook 8, and the fish swims away.

FIG. 5 depicts a large fish version of this invention. This version is not tapered because, being designed for larger fish, its straight tubular configuration is made large enough in diameter to house a slot large enough to capture a fishing line while simultaneously being small enough to fit into a fish's mouth without having to be tapered.

I claim:

1. A device for disengaging a fish hook from a fish's mouth, thereby releasing a hooked fish without the need to remove the fish from the water, said device comprising:

a) a tubular body having a through bore; said tubular body further having a proximal end which is sized for manual gripping by a fisherman; and a distal end which is sized for insertion into a fish's mouth, said proximal end and said distal end of said tubular body being coaxial and said tubular body having a length which is greater than the width of an adults palm;

b) a slot extending from said proximal end of said tubular body to said distal end of said tubular body, said slot allowing passage of a taut fishing line, on which a fish is hooked, into said through bore of said tubular body, said slot including flanges on each side thereof, which flanges extend inwardly into said through bore, said flanqes being operable to inhibit accidental exit of the fishing line from said through bore during the fish-releasing operation; and c) the wall thickness at the tip of said distal end of said tubular body being sized so as to engage a fish hook between the shank and barb of said fish hook, which is lodged in a fish's mouth, when the device is thrust against the fish hook so as to disengage the fish hook from the fish's mouth and release the fish from the fishing line while the fish remains in the water.

2. The device of claim 1 wherein said slot has radially inwardly converging side walls that facilitate radial passage of the fishing line into said through bore.

3. The device of claim 1 wherein said proximal end of said tubular body has a larger outside diameter than the outside diameter of said distal end of said tubular body.

4. The device of claim 3 wherein the outside diameter of said tubular body tapers inwardly from said proximal end of said tubular body to said distal end of said tubular body.

* * * * *